(12) United States Patent
Abe et al.

(10) Patent No.: US 9,211,915 B2
(45) Date of Patent: Dec. 15, 2015

(54) VEHICLE FRONT STRUCTURE

(71) Applicant: TOYOTA JIDOSHA KABUSHIKI KAISHA, Toyota-shi (JP)

(72) Inventors: Masatoshi Abe, Miyoshi (JP); Takashi Tagaito, Toyota (JP); Junki Niimoto, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/489,742

(22) Filed: Sep. 18, 2014

(65) Prior Publication Data
US 2015/0076862 A1 Mar. 19, 2015

(30) Foreign Application Priority Data

Sep. 18, 2013 (JP) ................................ 2013-193437

(51) Int. Cl.
  *B62D 25/08* (2006.01)
  *B62D 21/15* (2006.01)
  *B60R 19/16* (2006.01)
  *B60R 21/00* (2006.01)

(52) U.S. Cl.
  CPC ............ *B62D 25/082* (2013.01); *B62D 21/152* (2013.01); *B60R 19/16* (2013.01); *B60R 2021/0023* (2013.01)

(58) Field of Classification Search
  CPC .... B62D 25/08; B62D 21/152; B62D 25/082; B60R 19/34

USPC ....................................................... 296/187.1
See application file for complete search history.

(56) References Cited

U.S. PATENT DOCUMENTS

2012/0248820 A1* 10/2012 Yasui et al. .............. 296/187.09
2014/0159420 A1*  6/2014 Hashimoto et al. ........ 296/187.1
2014/0361560 A1* 12/2014 Sakakibara et al. .......... 293/133

FOREIGN PATENT DOCUMENTS

| JP | 11-78967 A   | 3/1999  |
| JP | 2010-132122  | 6/2010  |
| JP | 2012-214211 A| 11/2012 |

* cited by examiner

*Primary Examiner* — Jason S Morrow
(74) *Attorney, Agent, or Firm* — Oblon, McClelland, Maier & Neustadt, L.L.P.

(57) ABSTRACT

There is provided a vehicle front structure including: a power unit disposed at a front part side of the vehicle; a front side member disposed at an outer side of the power unit in a vehicle width direction the front side member extending along a vehicle front-rear direction; a protruding member provided on an outer wall of the front side member, the protruding member protruding to an outer side in the vehicle width direction relative the outer wall of the front side member; and an inclined wall formed in the protruding member, the inclined wall extending from an outer end portion of the protruding member in the vehicle width direction to an inner side in the vehicle width direction and a vehicle body rear side in the vehicle front-rear direction in a plain view.

6 Claims, 7 Drawing Sheets

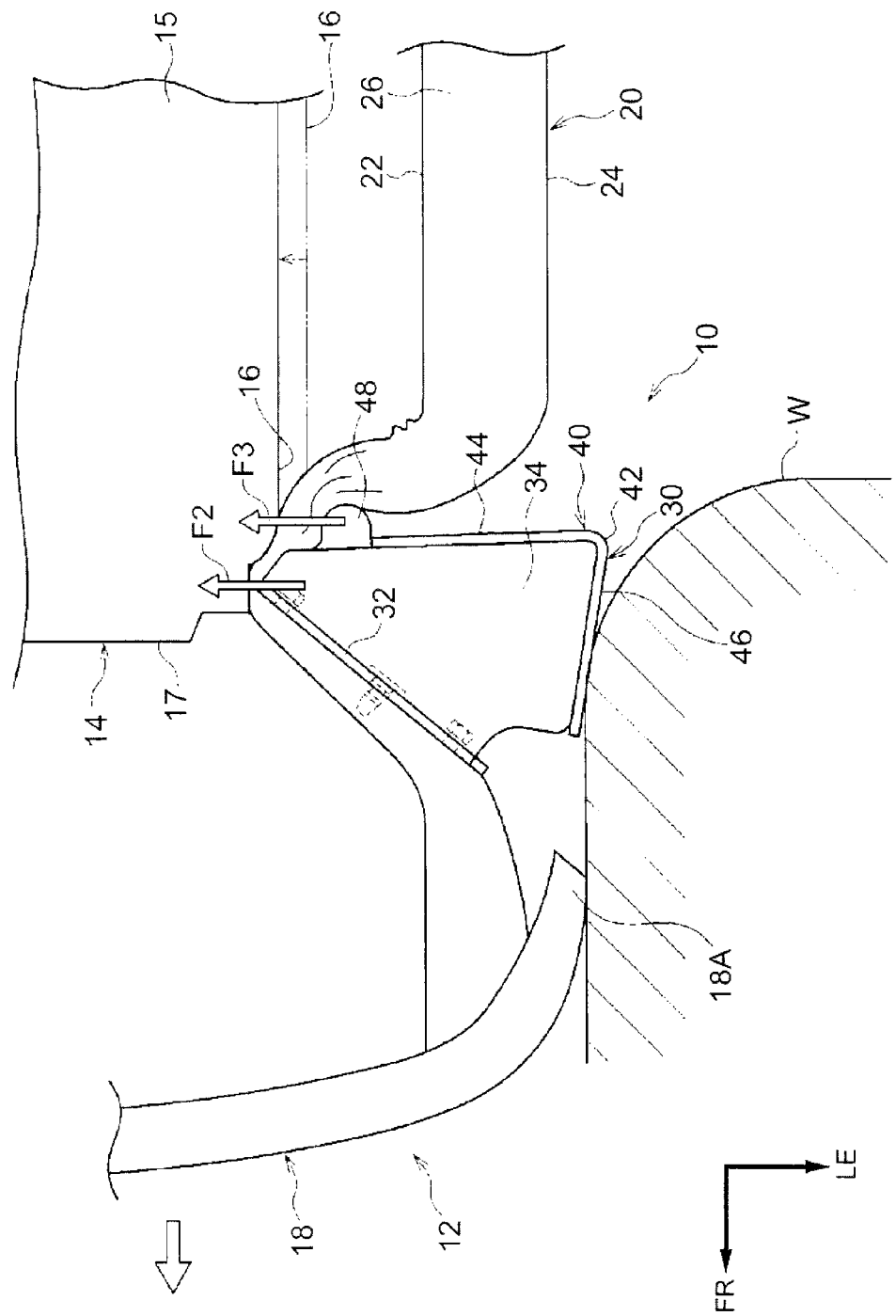

VEHICLE FRONT STRUCTURE

INCORPORATION BY REFERENCE

The disclosure of Japanese Patent Application No. 2013-193437 filed on Sep. 18, 2013 including the specification, drawings and abstract is incorporated herein by reference in its entirety.

BACKGROUND OF THE INVENTION

1. Field of the Invention

The present invention relates to a vehicle front structure.

2. Description of Related Art

A vehicle front structure in which an energy absorbing member is provided at an outer lateral side of a front side member and an outer bending portion is provided for the front side member, and at the time of a frontal impact of a vehicle, a collision load is applied to the front side member via the energy absorbing member to bend the front side member to an outer side has been proposed (for example, see Japanese Patent Application Publication No. 2010-132122 (JP 2010-132122 A)).

Incidentally, when a frontal impact occurs at an outer side in a vehicle width direction relative to the front side member (short overlap collision), in order to inhibit the deformation of a vehicle, it is desirable to generate a lateral force (a reaction force directed to an opposite side from a collision side in the vehicle width direction) to the vehicle, and the longer the time that the lateral force is applied is, the better.

SUMMARY OF THE INVENTION

Accordingly, the present invention obtains a vehicle front structure that can extend the time that a lateral force is applied to a vehicle at the time of a short overlap collision.

A vehicle front structure according to one aspect of the present invention includes: a power unit disposed at a front part side of the vehicle; a front side member disposed at an outer side of the power unit in a vehicle width direction, the front side member extending along a vehicle front-rear direction; a protruding member provided on an outer wall of the front side member, protruding member protruding to an outer side in the vehicle width direction relative to the outer wall of the front side member; an inclined wall formed in the protruding member, the inclined wall extending from an outer end portion of the protruding member in the vehicle width direction to an inner side in the vehicle width direction and a vehicle body rear side in the vehicle front-rear direction in a plain view; and a protruding portion provided on the side of the inclined wall of the protruding member, the protruding portion protruding to the outer side in the vehicle width direction relative to the inclined wall.

According to the vehicle front structure, the protruding member is provided on the outer wall of the front side member, and a protruding portion that protrudes to the outer side in the vehicle width direction is provided on the side of the inclined wall formed in the protruding member, the inclined wall extending from the outer end portion of the protruding member in the vehicle width direction to the inner side in the vehicle width direction at the vehicle body rear side. Accordingly, when a collision to a barrier occurs at the outer side in the vehicle width direction relative to the front side member (short overlap collision), a collision load is inputted to the protruding member and this protruding member presses the front side member to an inner side in the vehicle width direction. Consequently, the front side member is bent to abut the power unit, and a part of the collision load inputted to the protruding member is transmitted to the power unit.

Moreover, when the protruding member is further moved to a vehicle body rear side in accordance with the advancement of the vehicle, the protruding portion abuts the front side member to press the front side member to the inner side in the vehicle width direction. Therefore, the front side member is further bent to abut the power unit, and a part of the collision load inputted to the protruding member is further transmitted to the power unit. That is, by this protruding portion, the time to transmit the collision load to the power unit is extended. Accordingly, the time that the lateral force is applied to the vehicle at the time of the short overlap collision is extended.

As explained above, according to one aspect of the present invention, the time that the lateral force is applied to the vehicle at the time of the shot overlap collision can be extended.

Moreover, in the vehicle front structure, the protruding portion may be disposed at a vehicle body rear side in the vehicle front-rear direction and at the side of the inclined wall of the protruding member.

According to the vehicle front structure, the protruding portion is disposed at the vehicle body rear side in the vehicle front-rear direction and at the side of the inclined wall of the protruding member. Consequently, when the protruding member is caused to move to the vehicle body rear side in accordance with the advancement of the vehicle, the abutment failure of the protruding portion to the front side member is inhibited or prevented, and a pressing force to the front side member to the inner side in the vehicle width direction is secured excellently. Due to this, the time that the collision load is transmitted to the power unit is extended more surely and the time that the lateral force is applied to the vehicle at the time of the short overlap collision is extended more surely.

According to the vehicle front structure, the time that the lateral force is applied to the vehicle at the time of the short overlap collision can be extended more surely.

Also, in the vehicle front structure, the protruding portion may include an arcuate shape portion, the arcuate shape portion provided at a vehicle body rear side in the vehicle front-rear direction in a plain view.

According to the vehicle front structure, the protruding portion includes an arcuate shape portion, the arcuate shape portion provided at a vehicle body rear side in the vehicle front-rear direction in a plain view. Consequently, when the protruding member is caused to move to the vehicle body rear side in accordance with the advancement of the vehicle, an abutting time of the protruding portion to the front side member is made longer, and a pressing time to the front side member to the inner side in the vehicle width direction is made longer. That is, the time that the collision load is transmitted to the power unit is further extended, and the time that the lateral force is applied to the vehicle at the time of the short overlap collision is further extended.

According to the vehicle front structure, the time that the lateral force is applied to the vehicle at the time of the short overlap collision can be further extended.

Moreover, in the vehicle front structure, the protruding portion may be provided at a portion that the protruding portion overlaps with the power unit in a vehicle up and down direction in a side view seen from the vehicle width direction.

According to the vehicle front structure, the protruding portion is provided at a portion that the protruding portion overlaps with the power unit in a vehicle up and down direction in a side view seen from the vehicle width direction. Thus, by this protruding portion, a part of the collision load inputted to the protruding member is efficiently transmitted to the power unit via the front side member. This generates the lateral force to the vehicle efficiently at the time of the short overlap collision.

According to the vehicle front structure, the lateral force can be generated efficiently to the vehicle at the time of the short overlap collision.

Moreover, in the vehicle front structure, a length of the protruding member in the vehicle up and down direction may be set to be the same as a length of the front side member in the vehicle up and down direction.

According to the vehicle front structure, the length of the protruding member in the vehicle up and down direction is set to be the same as the length of the front side member in the vehicle up and down direction. Accordingly, by this protruding member, the front side member is efficiently pressed to the inner side in the vehicle width direction. Due to this, a part of the collision load inputted to the protruding member is efficiently transmitted to the power unit, and the lateral force is efficiently generated to the vehicle at the time of the short overlap collision. Additionally, "same" described herein includes the meaning substantially the same which is not exactly the same.

According to the vehicle front structure, the lateral force can be efficiently generated to the vehicle at the time of the short overlap collision.

In addition, in the vehicle front structure, a configuration may be made such that the protruding member includes an upper plate, a middle plate and a lower plate, the inclined wall is attached to the upper plate, the middle plate and the lower platen, the upper plate and the middle plate separated from each other with a space in the vehicle up and down direction, the middle plate and the lower plate separated from each other with a space in the vehicle up and down direction, a load receiving wall is attached at a vehicle body front side of the upper plate, the middle plate and the lower plate and, in a plain view, respective vehicle body rear side end portions of the upper plate, the middle plate and the lower plate are disposed at the same position.

According to the vehicle front structure, the load receiving wall is attached at the vehicle body front side of the upper plate, the middle plate and the lower plate, the inclined wall of the protruding member is attached to the upper plate, the middle plate and the lower plate, and, in a plain view, respective vehicle body rear side end portions of the upper plate, the middle plate and the lower plate are disposed at the same position. Consequently, the collision load inputted to the load receiving wall is concentrated at the respective vehicle body rear side end portions of the upper plate, the middle plate and the lower plate. Thus, the front side member is likely to be bent and deformed at a portion that faces the respective vehicle body rear side end portions of the upper plate, the middle plate and the lower plate in the vehicle width direction. Therefore, a part of the collision load inputted to the protruding member is transmitted to the power unit more efficiently, and the lateral force is generated to the vehicle at the time of the short overlap collision more efficiently.

According to the vehicle front structure, the lateral force can be generated to the vehicle at the time of the short overlap collision more efficiently.

In addition, in the vehicle front structure, in a plain view, at least two of respective vehicle body front side end portions of the upper plate, the middle plate and the lower plate at the side of the outer wall in the vehicle front-rear direction, may be mutually misaligned in the vehicle front-rear direction.

According to the vehicle front structure, in a plain view, at least two of the respective vehicle body front side end portions of the upper plate, the middle plate and the lower plate at the side of the outer wall i, are mutually misaligned in the vehicle front-rear direction. Consequently, the collision load inputted to the load receiving wall disperses at each vehicle body front side end portion of the upper plate, the middle plate and the lower plate at the side of the outer wall. Thus, the front side member is more likely to be bent and deformed at the portion that faces the respective the vehicle body rear side end portions of the upper plate, the middle plate and the lower plate in the vehicle width direction. Therefore, a part of the collision load inputted to the protruding member is transmitted to the power unit more efficiently, and the lateral force is generated to the vehicle at the time of the short overlap collision more efficiently.

According to the vehicle front structure, the lateral force can be generated to the vehicle at the time of the short overlap collision more efficiently.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is a plain view that shows the post-short overlap collision state of the vehicle front structure according to this embodiment, in which a vehicle further advances.

DETAILED DESCRIPTION OF EMBODIMENTS

Hereinafter, an embodiment of the present invention will be explained in detail with reference to the drawings. Incidentally, for convenience of explanation, an arrow UP, an arrow FR and an arrow LE shown in each drawing appropriately respectively show an upper direction, a front direction and a left direction of a vehicle body. Hereinafter, unless otherwise noted, when an up and down direction, a front-rear direction and a right and left direction are shown in the following explanation, these directions respectively show the up and down in a vehicle up and down direction, the front and rear in a vehicle front-rear direction and the right and left in a right-left direction (vehicle width direction) of the vehicle body. Further, while each drawing shows a left side of the vehicle body, a right side of the vehicle body is symmetrically the same, so that an explanation of the right side of the vehicle body is appropriately omitted.

Figure 4:
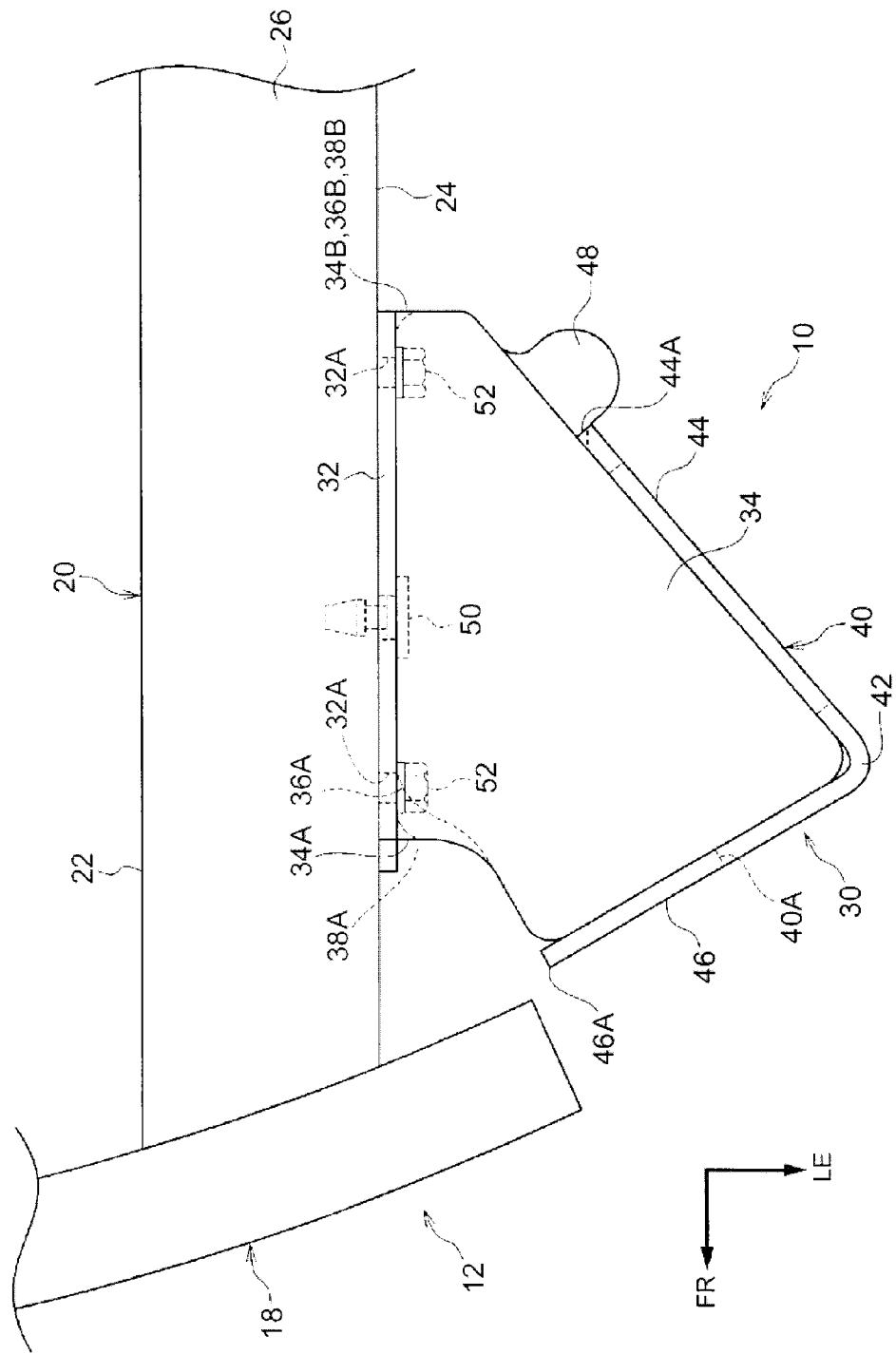
FIG. 4 is a plain view that shows a main part of the vehicle front structure according to this embodiment.
Figure 5:
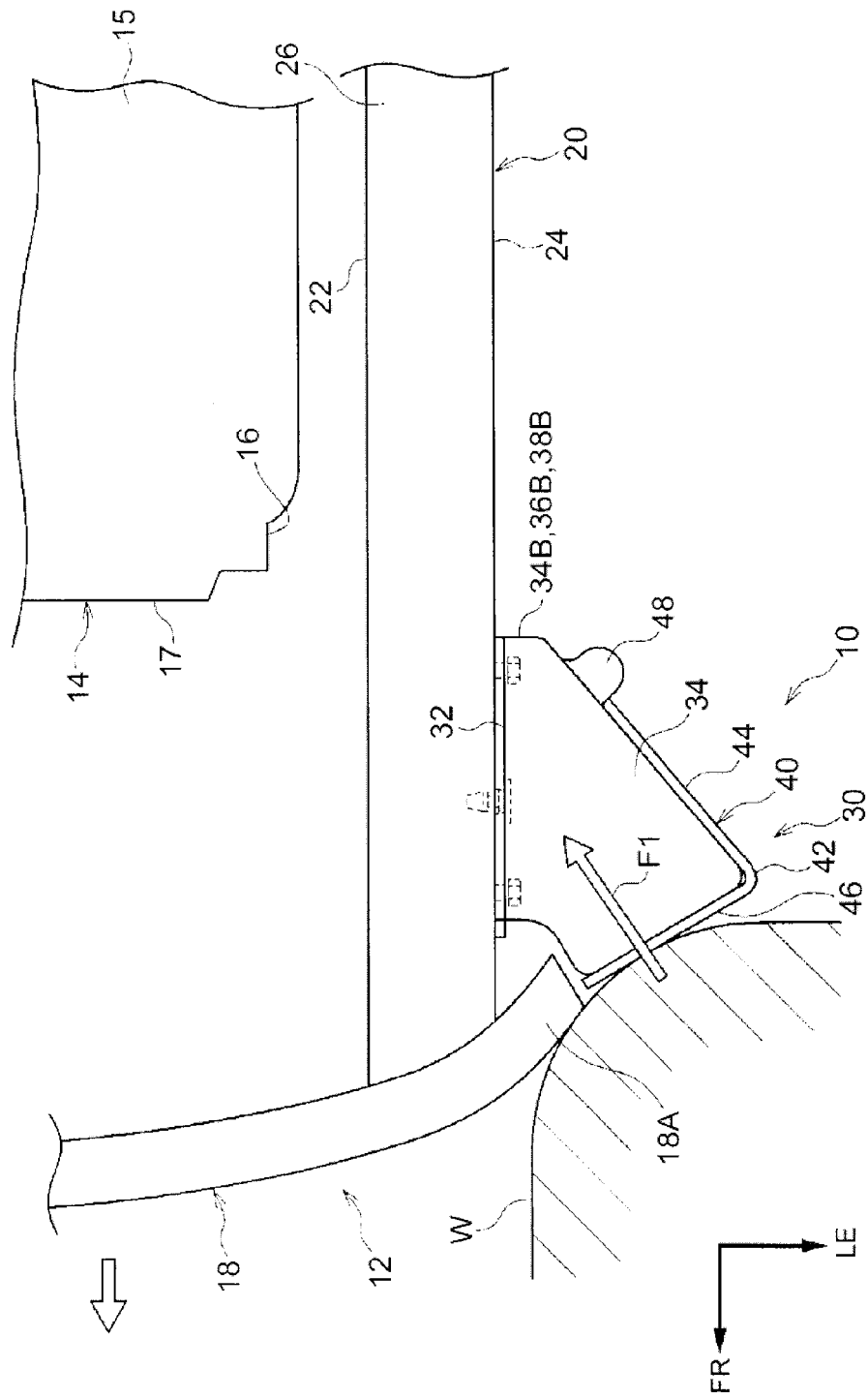
FIG. 5 is a plain view that shows a state of a short overlap collision of the vehicle front structure according to this embodiment.

As shown in FIGS. 4 and 5, at a center portion of a front portion of a vehicle body 12 in a vehicle width direction, a power unit 14 including an engine and a transmission etc. is disposed. Moreover, at an outer side of the power unit 14 in the vehicle width direction, a right and left pair of front side members 20 which has a rectangular closed cross section and extends in a vehicle front-rear direction is disposed.

Additionally, at a front end portion of each front side member 20, a crush box (not shown) may be provided coaxially with the front side member 20. Moreover, as shown also in FIGS. 1 and 3, between front end portions of each front side member 20, a front bumper reinforcement 18 which has a rectangular closed cross section and extends in the vehicle width direction is provided.

Figure 1:
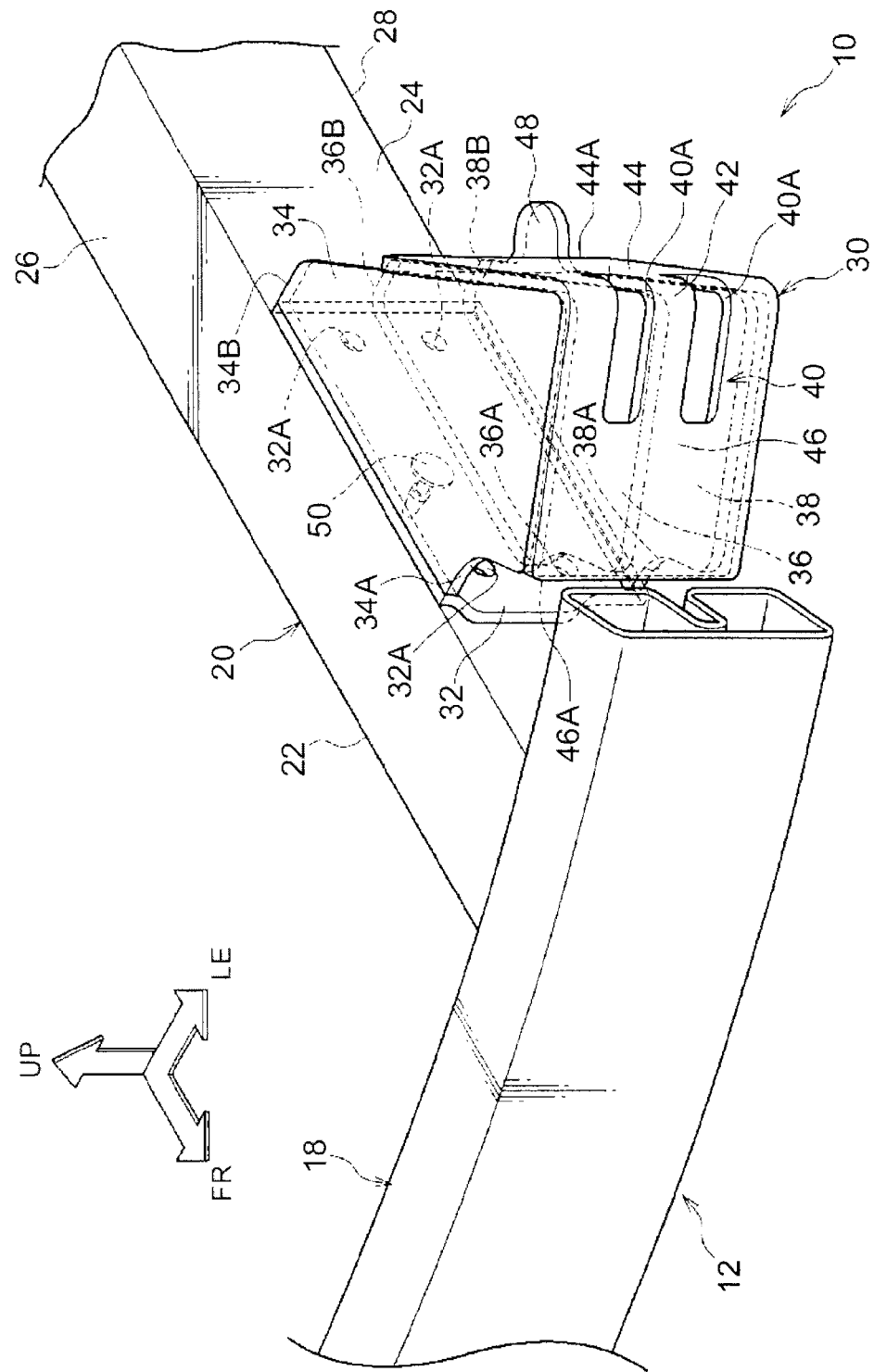
FIG. 1 is a perspective view that shows a main part of a vehicle front structure according to this embodiment.
Figure 2:
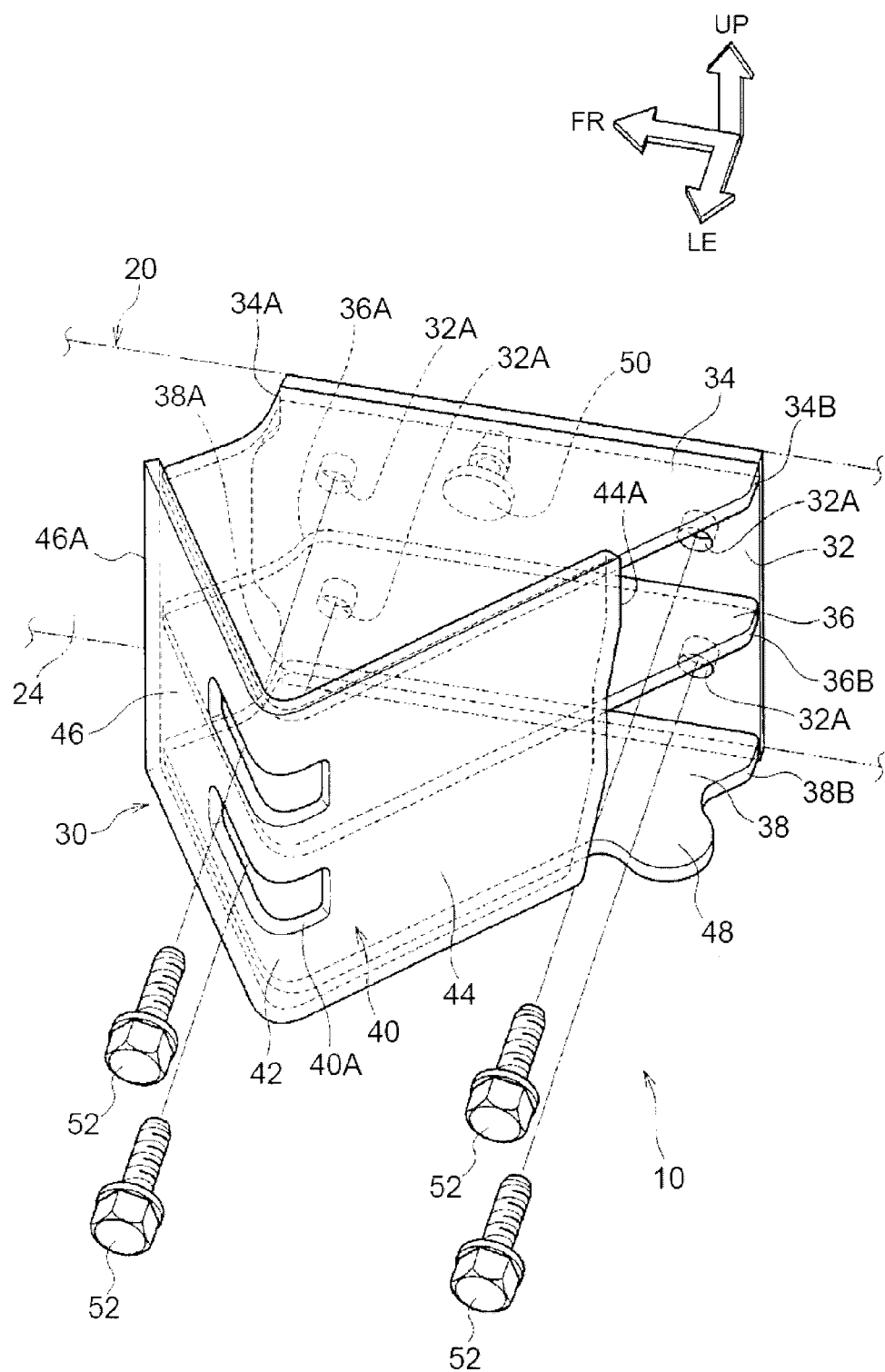
FIG. 2 is a perspective view that shows a protruding member constituting the vehicle front structure according to this embodiment.
Figure 3:
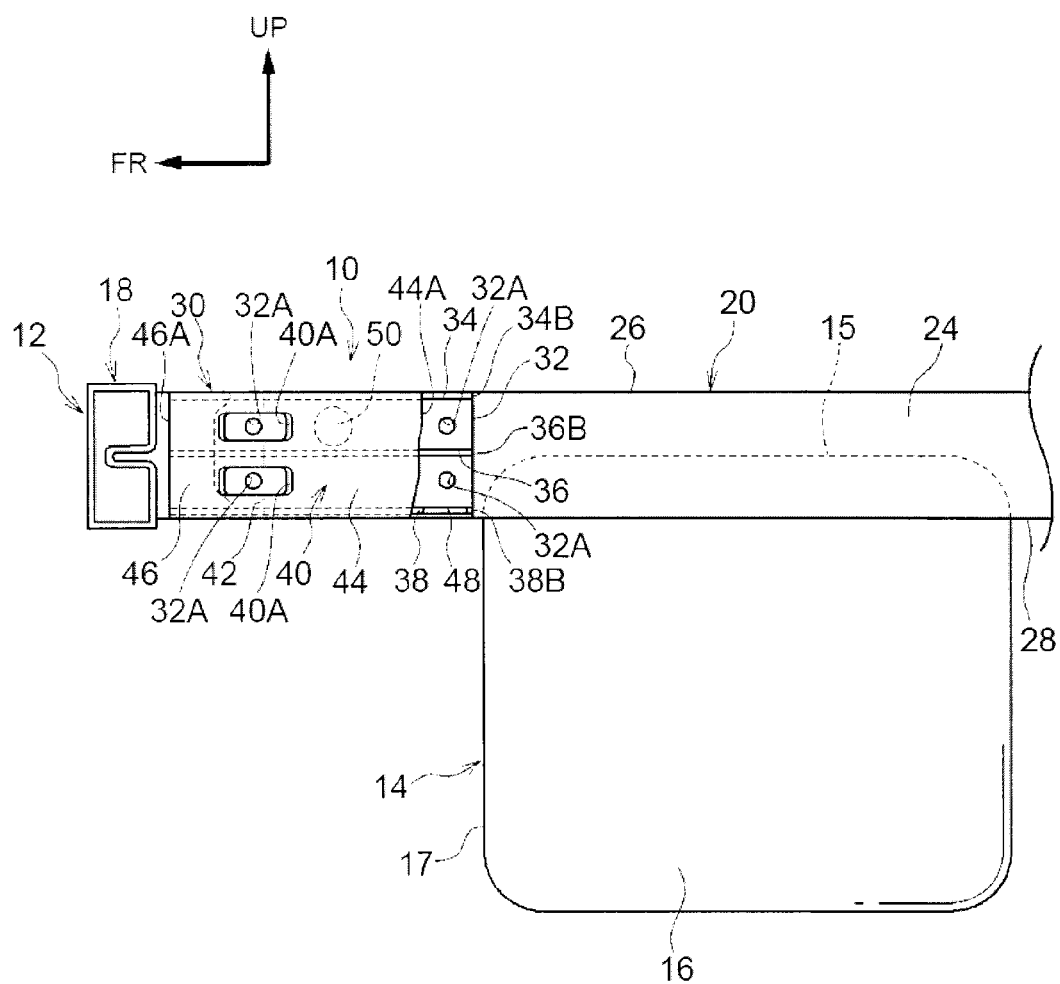
FIG. 3 is a side view that shows a main part of the vehicle front structure according to this embodiment.

As shown in FIGS. 1, 3 and 4, the front side member 20 includes an inner wall 22 which is a wall portion at the inner side in the vehicle width direction, an outer wall 24 which is a wall portion at the outer side in the vehicle width direction, an upper wall 26 which is a wall portion at an upper side in the vehicle up and down direction and a lower wall 28 which is a wall portion at a lower side in the vehicle up and down direction. Moreover, on the outer wall 24 of the front side member 20, a protruding member 30 which constitutes a vehicle front structure 10 according to this embodiment is provided.

Explaining this in detail, as shown in FIGS. 1 to 4, to the outer wall 24 of the front side member 20, the protruding member 30 which protrudes to the outer side relative to the outer wall 24 in the vehicle width direction is fastened and fixed by a bolt 52 and a weld nut (illustration is omitted). The protruding member 30 is constituted by metal, and includes a planar mounting plate 32 disposed on the side of outer wall 24 (inner side in the vehicle width direction) as well as the mounting plate 32 is attached to a planar upper plate 34, a planar middle plate 36 and a planar lower plate 38, the upper plate 34 and the middle plate 36 separated from each other with a space in the vehicle up and down direction, the middle plate 36 and the lower plate 38 separated from each other with a space in the vehicle up and down direction.

Further, the protruding member 30 includes a plate-like covering plate 40 attached to cover outer end surfaces of the upper plate 34, the middle plate 36 and lower plate 38 in the vehicle width direction. As shown in FIG. 4, the covering plate 40 is bent substantially perpendicular (substantially "L" letter-shaped) seen in a plain view to correspond to the shape of the upper plate 34, the middle plate 36 and the lower plate 38, and a bending portion (corner portion) which is bent is an outer end portion 42 of the protruding member 30 in the vehicle width direction (hereinafter, referred to as "outer end portion").

Moreover, as shown in FIG. 3, the length of the mounting plate 32 and the covering plate 40 in the vehicle up and down direction is substantially the same as that of the outer wall 24 in the vehicle up and down direction, and the upper plate 34 is bonded to upper end portions of the mounting plate 32 and covering plate 40 and the lower plate 38 is bonded to lower end portions of the mounting plate 32 and the covering plate 40 by arc welding or an adhesive agent etc., respectively. That is, the upper plate 34 is disposed to be substantially flush with the upper wall 26 and the lower plate 38 is disposed to be substantially flush with the lower wall 28. In addition, the middle plate 36 is bonded to substantially center portions of the mounting plate 32 and the covering plate 40 in the vehicle up and down direction by arc welding or an adhesive agent etc.

Moreover, as shown in FIGS. 1 to 4, a wall portion extends from the outer end portion 42 of the covering plate 40 to the inner side at the vehicle body rear side is an inclined wall 44, the inclined wall 44 inclines to the vehicle width direction and the vehicle front-rear direction in a plain view, and a rear end portion 34B of the upper plate 34, a rear end portion 36B of the middle plate 36 and a rear end portion 38B of the lower plate 38 which will be described later are disposed at the vehicle body rear side of the inclined wall 44. Moreover, a wall portion extends from the outer end portion 42 of the covering plate 40 to an inner side at a vehicle body front side is a load receiving wall 46, the load receiving wall 46 inclines to the vehicle width direction and the vehicle front-rear direction in a plain view.

Additionally, as shown in FIG. 4, vehicle body front side end portions of the mounting plate 32 disposed at the side of the outer wall 24 of the protruding member 30, that is, a front end portion 34A of the upper plate 34 at the side of the outer wall 24, a front end portion 36A of the middle plate 36 at the side of the outer wall 24 and a front end portion 38A of the lower plate 38 at the side of the outer wall 24 are disposed at the vehicle body rear side relative to the front end portion 46A of the load receiving wall 46 seen in a plain view. Moreover, the rear end portion 34B of the upper plate 34, the rear end portion 36B of the middle plate 36 and the rear end portion 38B of the lower plate 38 are disposed at the same position seen from a plain view.

In addition, at least two of the front end portion 34A of the upper plate 34 at the side of the outer wall 24, the front end portion 36A of the middle plate 36 at the side of the outer wall 24 and the front end portion 38A of the lower plate 38 at the side of the outer wall 24 are mutually misaligned in the vehicle front-rear direction in a plain view (side view). More concretely, the front end portion 36A of the middle plate 36 is disposed at the vehicle body rear side relative to the front end portion 34A of the upper plate 34 and the front and portion 38A of the lower plate 38. Because of this, the front end portion 36A of the middle plate 36 and the front end portion 34A of the upper plate 34 (or the front end portion 38A of the lower plate 38) are mutually misaligned in the vehicle front-rear direction.

Moreover, as shown in FIGS. 1 to 4, at a portion of the mounting plate 32 between the upper plate 34 and the middle plate 36 and a portion of the mounting plate 32 between the middle plate 36 and the lower plate 38, penetration holes 32A for inserting the bolt 52 are formed to be spaced in the front-rear direction. In addition, in the covering plate 40, two penetration holes 40A for inserting the bolt 52 into each of the front-side penetration hole 32A are formed to be aligned in up and down direction, and a rear end portion 44A of the covering plate 40 (inclined wall 44) is cut out for inserting the bolt 52 into each of the rear-side penetration holes 32A.

Additionally, in the outer wall 24 of the front side member 20, a plurality of penetration holes that communicate with each of the penetration holes 32A (illustration is omitted) are formed, and at an inner side of the outer wall 24 of the front side member 20, a weld nut (illustration is omitted) is provided coaxially with each of the penetration holes.

Also, to a substantially center portion of the mounting plate 32 between the upper plate 34 and the middle plate 36 in the vehicle front-rear direction, a temporary joint member 50 that temporarily joints the protruding member 30 to the outer wall 24 is attached. Since the temporary joint member 50 is inserted into a penetration hole (illustration is omitted) formed on the outer wall 24 to be locked, the protruding member 30 is temporarily retained before it is fastened to the outer wall 24 by the bolt.

Moreover, at the vehicle body rear side of the inclined wall 44, that is, at the side of the rear end portion 38B of the lower plate 38 not covered by the covering plate 40 (at a slightly front side relative to the rear end portion 38B), a protruding portion 48 that protrudes to the outer side in the vehicle width direction is integrally formed. This protruding portion 48 has the same thickness as that of the lower plate 38 and is formed to be substantially disc-shaped in a plain view, and protrudes substantially perpendicular to the inclined wall 44 with a predetermined length (diameter). Additionally, the shape of the protruding portion 48 is not limited to substantially a disc, and any shape may be applied as long as at least a vehicle body rear side portion is formed to be arcuate (round shape) in a plain view, that is the protruding portion 48 may include an arcuate shape portion, the arcuate shape portion provided at a vehicle body rear side in the vehicle front-rear direction in a plain view.

Moreover, the protruding portion 48 is provided at a portion that the protruding portion 48 overlaps with the power unit 14 in the vehicle up and down direction in a side view seen from the vehicle width direction. Here, as shown in FIG. 3, an upper wall portion 15 of the power unit 14 is disposed at the side of the lower wall 28 relative to a center portion of the outer wall 24 of the front side member 20 in the vehicle up and down direction. Consequently, this protruding portion 48 is provided at the lower plate 38. Additionally, the protruding portion 48 may be provided not only at the lower plate 38 but also for the middle plate 36 or the upper plate 34 as long as it overlaps with the power unit 14 in the vehicle up and down direction.

Also, the protruding member 30 is fastened and fixed to a predetermined position of the outer wall 24 such that, when the front side member 20 is bent to be deformed to the inner side in the vehicle width direction in a collision with a barrier W which will be described later, the bent inner wall 22 of the front side member 20 abuts a side wall portion 16 of the power unit 14. More concretely, as shown in FIGS. 3 and 5, the protruding member 30 is fastened and fixed to a predetermined position of the outer wall 24 such that each of the rear end portions 34B, 36B and 38B is positioned slightly at the vehicle body front side relative to a front wall portion 17 of the power unit 14 in a plain view.

Moreover, the protruding member 30 is not limited to a configuration having the upper plate 34, the middle plate 36 and the lower plate 38 as shown in the drawings and to a configuration made of a metal material. That is, the protruding member 30 may be made of a resin material for example, as long as it has rigidity (strength) capable of receiving a collision load. In this case, the protruding portion 48 may be formed to be substantially disc-shaped in a plain view integrally with the protruding member 30.

Moreover, the protruding member 30 is not limited to a configuration that it is attached to the outer wall 24 by the bolt 52 or the weld nut. The protruding member 30 may be configured such that it is attached to the outer wall 24 by arc welding, an adhesive agent or a rivet etc. In addition, the protruding member 30 may be attached to the outer wall 24 by using the bolt 52 and the weld nut in conjunction with the adhesive agent.

In the vehicle front structure 10 as configured above, next, an operation will be explained.

As shown in FIG. 5, for example, when a short overlap collision in which an outer portion in the vehicle width direction relative to the front side member 20 at the left side of the vehicle (vehicle body 12), that is, a left end portion 18A of the front bumper reinforcement 18 collides with a barrier W occurs, in accordance with the advancement of the vehicle, the load receiving wall 46 of the protruding member 30 provided to protrude from the outer wall 24 of the left-side front side member 20 collides with the barrier W.

Here, the upper plate 34 is disposed to be substantially flush with the upper wall 26, and the lower plate 38 is disposed to be substantially flush with the lower wall 28 (see FIG. 3). Moreover, as shown in FIG. 4, the front end portion 36A of the middle plate 36 at the side of the outer wall 24 is disposed at the vehicle body rear side relative to the front end portion 34A of the upper plate 34 at the side of outer wall 24 and the front end portion 38A of the lower plate 38 at the side of outer wall 24 in a plain view. Further, the rear end portion 34B of the upper plate 34, the rear end portion 36B of the middle plate 36 and the rear end portion 38B of the lower plate 38 are disposed at the same position in a plain view.

Also, in a plain view, the inclined wall 44 extends in a direction which is substantially orthogonal to the load receiving wall 46, that is, a direction substantially along an input direction of the collision load (shown as an arrow F1 in FIG. 5), and the respective rear end portions 34B, 36B and 38B are disposed in an extending direction of the inclined wall 44. Accordingly, when the collision load is inputted to the load receiving wall 46, the collision load disperses at the front end portion 34A of the upper plate 34, the front end portion 36A of the middle plate 36 and the front end portion 38A of the lower plate 38, and concentrates at the rear end portion 34B of the upper plate 34, the rear end portion 36B of the middle plate 36 and the rear end portion 38B of the lower plate 38.

That is, a force that the rear end portion 34B of the upper plate 34, the rear end portion 36B of the middle plate 36 and the rear end portion 38B of the lower plate 38 press to the inner side in the vehicle width direction a part of the outer wall 24 that faces the respective rear end portions 34B, 36B and 38B in the vehicle width direction becomes larger than a force that the front end portion 34A of the upper plate 34, the front end portion 36A of the middle plate 36 and the front end portion 38A of the lower plate 38 press to the inner side in the vehicle width direction a part of the outer wall 24 that faces the respective front end portions 34A, 36A and 38A in the vehicle width direction.

In other words, the part of the outer wall 24 of the front side member 20 that faces the rear end portion 34B of the upper plate 34, the rear end portion 36B of the middle plate 36 and the rear end portion 38B of the lower plate 38 in the vehicle width direction is more likely bent and deformed to the inner side in the vehicle width direction relative to the part of the outer wall 24 of the front side member 20 that faces the front end portion 34A of the upper plate 34, the front end portion 36A of the middle plate 36 and the front end portion 38A of the lower plate 38 in the vehicle width direction.

Figure 6:
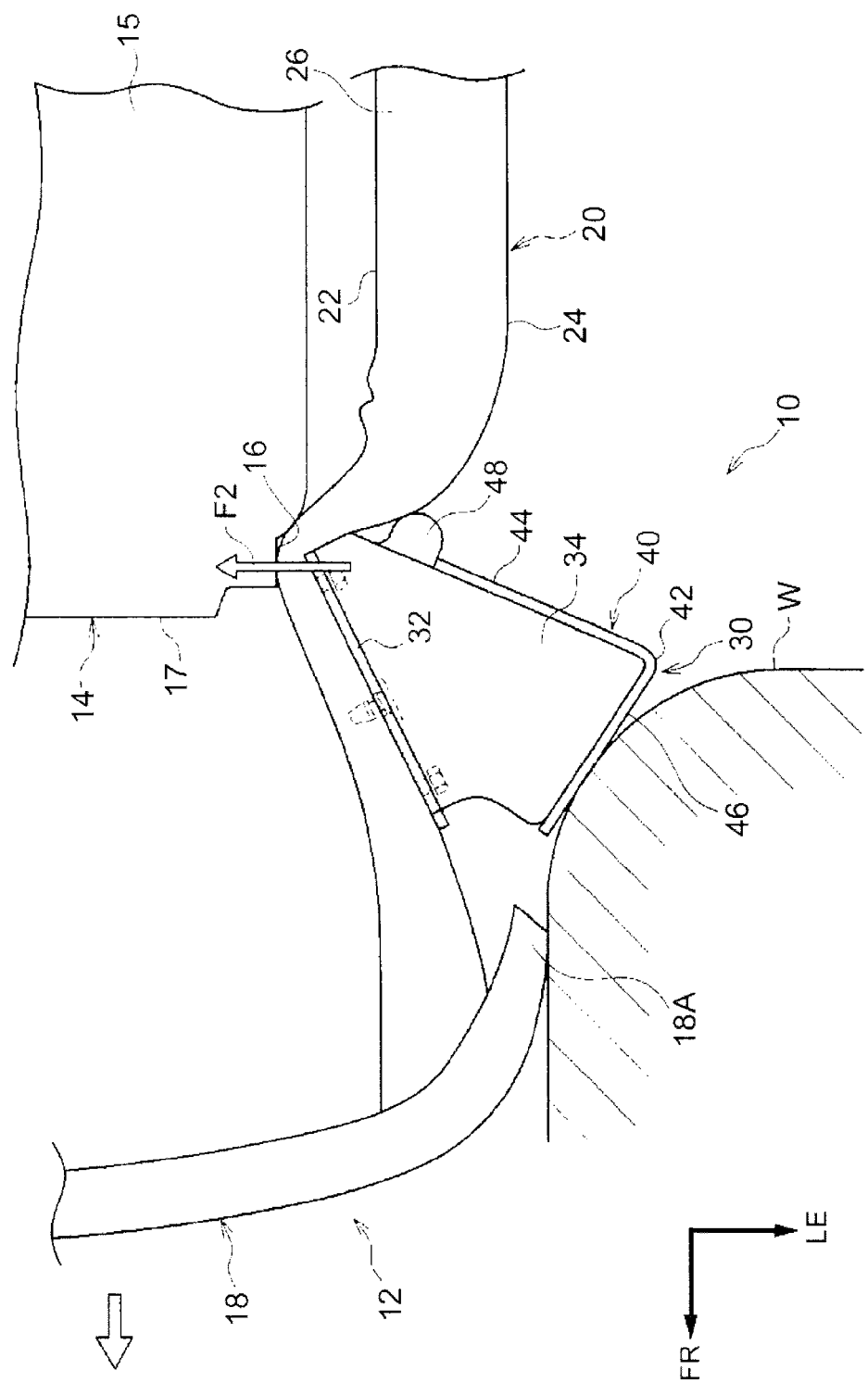
FIG. 6 is a plain view that shows a post-short overlap collision state of the vehicle front structure according to this embodiment.

Thus, as shown in FIG. 6, when the upper plate 34, the middle plate 36 and the lower plate 38 are relatively pressed to the vehicle body rear side via the load receiving wall 46, due to the force that the respective rear end portions 34B, 36B and 38B press to the inner side in the vehicle width direction a part of the outer wall 24 that faces the respective rear end portions 34B, 36B and 38B in the vehicle width direction, the part of the outer wall 24 is efficiently bent and deformed to the inner side in the width direction, and a part of the inner wall 22 of the bent and deformed front side member 20 abuts the side wall portion 16 of the power unit 14 to press the side wall portion 16 to the inner side in the vehicle width direction.

Due to this, at least a part of the collision load inputted to the protruding member 30 is efficiently transmitted to the power unit 14 via the front side member 20 (shown as an arrow F2 in FIG. 6). Therefore, a lateral force (a reaction force directed to an opposite side from a collision side in the vehicle width direction) to the vehicle (vehicle body 12) can be generated at an early stage of the collision efficiently.

In addition, as shown in FIG. 7, when the vehicle (vehicle body 12) further advances, the protruding member 30 is further pressed relatively to the vehicle body rear side by the barrier W, and further pivots to the vehicle body rear side setting the side of the respective rear end portions 34B, 36B and 38B in a plain view as the center (pivot point). Here, in a side view seen from the vehicle width direction, at the side of the rear end portion 38B of the lower plate 38 that the protruding portion 48 overlaps with the power unit 14 in the vehicle up and down direction, the protruding portion 48 which is substantially disc-shaped in a plain view is provided to protrude.

Accordingly, when the protruding member 30 is further caused to pivot (move) to the vehicle body rear side, a peripheral surface of the protruding portion 48 abuts the outer wall 24 of the bent front side member 20 to press the bent outer wall 24 further to the inner side in the vehicle width direction. That is, while the abutment failure of the protruding portion 48 to the outer wall 24 can be inhibited or prevented, a pressing force to the outer wall 24 can be secured excellently.

Due to this, the inner wall 22 of the further bent front side member 20 abuts the side wall portion 16 of the power unit 14, and by the protruding portion 48, the side wall portion 16 can be efficiently pressed to the inner side in the vehicle width direction via the front side member 20. Thus, at least a part of the collision load inputted to the protruding member 30 is transmitted to the power unit 14 via the front side member 20 (shown as an arrow F3 in FIG. 7) more efficiently.

Furthermore, since this protruding portion 48 is formed to be substantially disc-shaped in a plain view, when the protruding member 30 is caused to pivot (move) to the vehicle body rear side, an abutting (pressing) time of the protruding portion 48 to the outer wall 24 is made longer by the length of its peripheral surface (circumference), and a pressing time of the protruding portion 48 to the side wall portion 16 of the power unit 14 (via the front side member 20) is made longer by the length of its peripheral surface (circumference).

That is, by this protruding portion 48, a duration time that at least a part of the collision load inputted to the protruding member 30 is transmitted to the power unit 14 via the front side member 20 (a duration time that the protruding member 30 continues to press the side wall portion 16 of the power unit 14 via the front side member 20) can be extended compared to a protruding member having no protruding portion 48 (illustration is omitted).

Therefore, a duration time that the lateral force (the reaction force directed to an opposite side from the collision side in the vehicle width direction) is applied to the vehicle (vehicle body 12) can be extended compared to a case where no protruding portion 48 is provided, and the lateral force generated to the vehicle can be efficiently increased. Accordingly, in the short overlap collision, a vehicle interior (passenger compartment) can be effectively separated from the barrier W, which inhibits or prevents the deformation of the vehicle interior (passenger compartment).

As described above, while an explanation is made on the vehicle front structure 10 according to this embodiment with reference to the drawings, the vehicle front structure 10 according to this embodiment is not limited to one shown in the drawings, and design modification can be appropriately executed without departing from the gist of the present invention. For example, the shape of the protruding member 30 is not limited to one shown in the drawings as long as it includes at least the inclined wall 44 and the protruding portion 48 protrudes from the inclined wall 44 to the outer side in the vehicle width direction.

Also, any configuration is acceptable as long as, when the collision load is inputted to the load receiving wall 46, the collision load disperses at the front end portion 34A of the upper plate 34, the front end portion 36A of the middle plate 36 and the front end portion 38A of the lower plate 38. Accordingly, the front end portion 34A of the upper plate 34 may be disposed at the vehicle body rear side relative to the front end portion 36A of the middle plate 36 and the front end portion 38A of the lower plate 38, or the front end portion 38A of the lower plate 38 may be disposed at the vehicle body rear side relative to the front end portion 34A of the upper plate 34 and the front end portion 36A of the middle plate 36.

Further, the front end portion 34A of the upper plate 34 as well as the front end portion 36A of the middle plate 36 may be disposed at the vehicle body rear side relative to the front end portion 38A of the lower plate 38, the front end portion 36A of the middle plate 36 as well as the front end portion 38A of the lower plate 38 may be disposed at the vehicle body rear side relative to the front end portion 34A of the upper plate 34 or the front end portion 34A of the upper plate 34 as well as the front end portion 38A of the lower plate 38 may be disposed at the vehicle body rear side relative to the front end portion 36A of the middle plate 36. Furthermore, the front end portion 34A of the upper plate 34, the front end portion 36A of the middle plate 36 and the front end portion 38A of the lower plate 38 may be disposed at different positions (positions which are mutually not the same).

In addition, the rear end portion of 34B of the upper plate 34, the rear end portion 36B of the middle plate 36 and the rear end portion 38B of the lower plate 38 may be disposed not at exactly the same position but at substantially the same position allowing a little misalignment as long as the collision load is transmitted with concentration. Moreover, while an explanation is made with the understanding that the vehicle front structure 10 according to this embodiment is symmetrical, it may be asymmetrical. That is, a configuration may be made such that the protruding member 30 is provided for only the outer wall 24 of one of the right and left front side members 20.

What is claimed is:

1. A vehicle front structure comprising:
   a power unit disposed at a front part side of the vehicle;
   a front side member disposed at an outer side of the power unit in a vehicle width direction, the front side member extending along a vehicle front-rear direction;
   a protruding member provided on an outer wall of the front side member, the protruding member protruding to an outer side in the vehicle width direction relative to the outer wall of the front side member;
   an inclined wall formed in the protruding member, the inclined wall extending from an outer end portion of the protruding member in the vehicle width direction to an inner side in the vehicle width direction and a vehicle body rear side in the vehicle front-rear direction in a plain view; and
   a protruding portion provided on a side of the inclined wall of the protruding member, the protruding portion protruding to the outer side in the vehicle width direction relative to the inclined wall,
   wherein the protruding portion is disposed at the vehicle body rear side in the vehicle front-rear direction and at the side of the inclined wall of the protruding member.

2. The vehicle front structure according to claim 1, wherein the protruding portion includes an arcuate shape portion, the arcuate shape portion provided at the vehicle body rear side in the vehicle front-rear direction in a plain view.

3. The vehicle front structure according to claim 1, wherein the protruding portion is provided at a portion that the protruding portion overlaps with the power unit in a vehicle up and down direction in a side view seen from the vehicle width direction.

4. The vehicle front structure according to claim 1, wherein a length of the protruding member in a vehicle up and down direction is set to be the same as a length of the front side member in the vehicle up and down direction.

5. The vehicle front structure according to claim 1, wherein the protruding member includes an upper plate, a middle plate and a lower plate, the inclined wall is attached to the upper plate, the middle plate and the lower plate, the upper plate and the middle plate separated from each other with a space in a vehicle up and down direction, the middle plate and the lower plate separated from each other with a space in the vehicle up and down direction, a load receiving wall is attached at a vehicle body front side of the upper plate, the middle plate and the lower plate and, in a plain view, respective vehicle body rear side end portions of the upper plate, the middle plate and the lower plate are disposed at a same position.

6. The vehicle front structure according to claim 5, wherein in a plain view, at least two of respective vehicle body front side end portions of the upper plate, the middle plate and the lower plate at a side of the outer wall, are mutually misaligned in the vehicle front-rear direction.

\* \* \* \* \*